(12) United States Patent
Suda

(10) Patent No.: US 8,582,920 B2
(45) Date of Patent: Nov. 12, 2013

(54) PRESENTATION DEVICE

(75) Inventor: Yasushi Suda, Kasugai (JP)

(73) Assignee: Elmo Company, Limited (JP)

( * ) Notice: Subject to any disclaimer, the term of this patent is extended or adjusted under 35 U.S.C. 154(b) by 406 days.

(21) Appl. No.: 12/844,200

(22) Filed: Jul. 27, 2010

(65) Prior Publication Data

US 2011/0026769 A1 Feb. 3, 2011

(30) Foreign Application Priority Data

Jul. 28, 2009 (JP) ................. 2009-174855

(51) Int. Cl.
*G06K 9/48* (2006.01)
(52) U.S. Cl.
USPC ............................ 382/284; 382/294; 382/195
(58) Field of Classification Search
USPC .......................................... 382/294, 195, 284
See application file for complete search history.

(56) References Cited

U.S. PATENT DOCUMENTS

| | | | | | |
|---|---|---|---|---|---|
| 5,465,163 | A | * | 11/1995 | Yoshihara et al. | 358/444 |
| 6,661,425 | B1 | * | 12/2003 | Hiroaki | 345/629 |
| 7,149,262 | B1 | * | 12/2006 | Nayar et al. | 375/341 |
| 7,394,053 | B2 | * | 7/2008 | Frangioni et al. | 250/208.1 |
| 8,423,294 | B2 | * | 4/2013 | Nadel et al. | 702/19 |
| 2004/0229210 | A1 | * | 11/2004 | Sabry et al. | 435/4 |
| 2006/0215232 | A1 | | 9/2006 | Ziv-el | |
| 2007/0008341 | A1 | * | 1/2007 | Endo et al. | 345/633 |
| 2007/0147704 | A1 | * | 6/2007 | Hirai | 382/294 |
| 2007/0260985 | A1 | * | 11/2007 | Utagawa et al. | 715/721 |
| 2008/0177640 | A1 | * | 7/2008 | Gokturk et al. | 705/27 |
| 2010/0135582 | A1 | * | 6/2010 | Gokturk et al. | 382/195 |

FOREIGN PATENT DOCUMENTS

| | | |
|---|---|---|
| EP | 0 453 594 | 10/1991 |
| GB | 2 447 714 | 9/2008 |
| JP | 8-307651 | 11/1996 |
| JP | 2002-94856 | 3/2002 |
| JP | 2003-280084 | 10/2003 |
| JP | 2004-20889 | 1/2004 |
| JP | 2004-048634 A | 2/2004 |
| JP | 2005-72744 | 3/2005 |

OTHER PUBLICATIONS

British Search Report dated Nov. 5, 2010 in connection with corresponding British Application No. GB1012540.9.

* cited by examiner

*Primary Examiner* — Vu Le
*Assistant Examiner* — Aklilu Woldemariam
(74) *Attorney, Agent, or Firm* — Ostrolenk Faber LLP

(57) ABSTRACT

A presentation device comprises an image capture portion for capturing an image of a subject and generating a raw image thereof; a detection portion adapted to analyze whether a first marker is present in the raw image, and if the first marker is present in the raw image, to detect an existing position of the first marker within the raw image; a storage portion for storing a positional relationship of a synthesis position at which a mask image for masking at least a portion of the raw image is synthesized with the raw image relative to the existing position of the first marker; a synthesized image generation portion adapted to determine the synthesis position according to the positional relationship with the detected existing position, and to synthesize the mask image at the determined synthesis position within the raw image to generate a synthesized image; and an output portion for outputting the synthesized image.

3 Claims, 7 Drawing Sheets

Fig.3

| MARKER | CLASS | MASK RANGE DATA (RELATIVE COORDINATES) |
|---|---|---|
| MKa [A] | CREATE MASK MARKER | (+50, +20) ▬▬▬ (+150, +40) |
| MKb [B] | CREATE MASK MARKER | (+100, +10) ▬▬ (+160, +30) |
| MKc [C] | CREATE MASK MARKER | (−20, +40) ■ (+20, +80) |
| MKe [Ø] | ERASE MASK MARKER | |

INF

ORIGINAL SIZE

WITH OPTICAL ZOOM (2X)

PRESENTATION DEVICE

CROSS-REFERENCE TO RELATED APPLICATION

The present application claims the priority based on Japanese Patent Application No. 2009-174855 filed on Jul. 28, 2009, the disclosure of which is hereby incorporated by reference in its entirety.

BACKGROUND

1. Technical Field

The present invention relates to a presentation device adapted to capture and generate an image of a document, and to display the image on an external display device.

2. Related Art

Certain conventional presentation devices, such as those disclosed in JP-A-2005-72744, JP-A-2004-20889, and JP-A-2002-94856, have a function for masking portions of a captured image. This function can be utilized, for example in the course of a lecture in a classroom, for the purpose of presenting an exam sheet to students while concealing the correct answers.

According to the prior art however, each time that the mask function is to be used, it is necessary to select an area for masking by operating a remote control or a control console on the unit, which makes operation cumbersome. Moreover, because the selected mask area is fixed over the image, if the document to be captured is moved, portions of the document may be masked or exposed unintentionally.

SUMMARY

An object of the present invention is to provide a presentation device that affords a more convenient masking process.

A first aspect of the invention is directed to a presentation device. The device includes an image capture portion for capturing an image of a subject and generating a raw image thereof; a detection portion adapted to analyze whether a first marker is present in the raw image, and if the first marker is present in the raw image, to detect an existing position of the first marker within the raw image; a storage portion for storing a positional relationship of a synthesis position at which a mask image for masking at least a portion of the raw image is synthesized with the raw image relative to the existing position of the first marker; a synthesized image generation portion adapted to determine the synthesis position according to the positional relationship with the detected existing position, and to synthesize the mask image at the determined synthesis position within the raw image to generate a synthesized image; and an output portion for outputting the synthesized image.

According to this aspect, if the first marker is present within the raw image, the mask image for masking at least a portion of the raw image is synthesized at the synthesis position having a predetermined relative positional relationship to the position of the first marker. Thus, even if the first marker shifts position within the raw image, the mask image in the output synthesized image shifts in association with this shift in position. As a result, it is possible for the user to accurately mask the desired portion, and to provide a presentation device that affords a more convenient masking process.

A second aspect of the invention is the presentation device according to the above aspect, wherein if the first marker is present in the raw image, the detection portion further detects the inclination of the first marker; and the synthesized image generation portion adjusts the synthesis position and the inclination of the mask image according to the detected inclination. According to this aspect, even if the subject is captured at a tilted angle, it is possible for the user to nevertheless accurately mask the desired portion.

A third aspect of the invention is the presentation device according to the above aspect, wherein if the first marker is present in the raw image, the detection portion further detects a size of the first marker; and the synthesized image generation portion adjusts the synthesis position and a size of the mask image according to the detected size. According to this aspect, if the subject is captured at enlarged or reduced magnification through optical zoom or the like, it is possible for the user to nevertheless accurately mask the desired portion.

A fourth aspect of the invention is the presentation device according to the above aspect, wherein the detection portion further analyzes whether a second marker different from the first marker is present in the raw image; and if the second marker is present in the raw image, the synthesized image generation portion executes a prescribed process in relation to the synthesis. According to this aspect, it is possible to carry out various different processes in relation to synthesis, according to whether the second marker is present on the subject.

A fifth aspect of the invention is the presentation device according to the above aspect, wherein if the second marker is present in the raw image, the synthesized image generation portion executes as the prescribed process a process to erase the mask image from the synthesized image. According to this aspect, if the first marker is present on the subject, the mask image can be easily erased by positioning the second marker on the subject.

Besides the aspect of a presentation device described above, the present invention in additional aspects thereof may be embodied as a method of control or a method of use of a presentation device; a computer program; or a recording medium having such a program recorded thereon.

These and other objects, features, aspects, and advantages of the invention will become more apparent from the following detailed description of the preferred embodiments with the accompanying drawings

BRIEF DESCRIPTION OF THE DRAWINGS

FIG. 3 is an illustration depicting an example of mask information;

DESCRIPTION OF THE PREFERRED EMBODIMENTS

The aspects of the invention are described below based on the preferred embodiment, in the following order.

A. Presentation device Features:
B. Masking Process:
C. Modification:

A. Presentation Device Features

Figure 1:
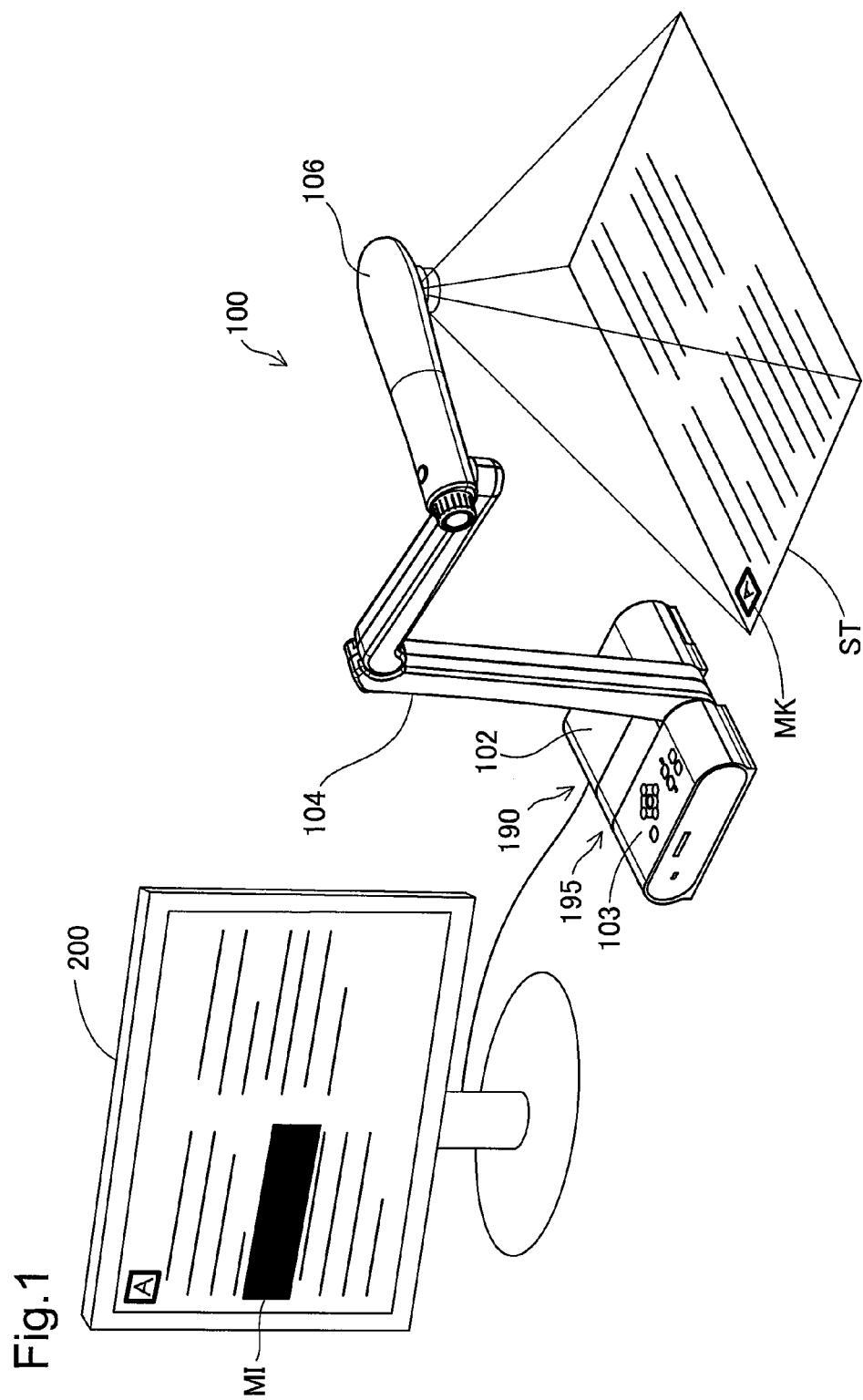
FIG. 1 is an exterior view of a presentation device according to an embodiment of the invention.

FIG. 1 is an exterior view of a presentation device 100 according to an embodiment of the invention. The presentation device 100 includes a base 102 adapted to be placed on a surface such as a desktop; a control console 103 provided on the base 102; an articulable support post 104 that extends upward from the base 102; and a camera head 106 mounted on the distal end of the support post 104. The camera head 106 houses a CCD camera, and captures an image of a document ST (subject) that has been positioned on the desktop. A video output terminal 190 and a USB interface 195 are provided on the back face of the base 102. The video output terminal 190 is used to connect a device such as a liquid crystal display 200, a projector, or a television. A computer (not shown) is connected to the USB interface 195. The video output terminal 190 and the USB interface 195 output the image of the document ST captured by the camera head 106.

The presentation device 100 of the present embodiment has a function for synthesizing a prescribed mask image MI in the output image, according to whether a masking process marker MK is placed on the captured image ST. The features and process for carrying out this function are described in detail below.

Figure 2:
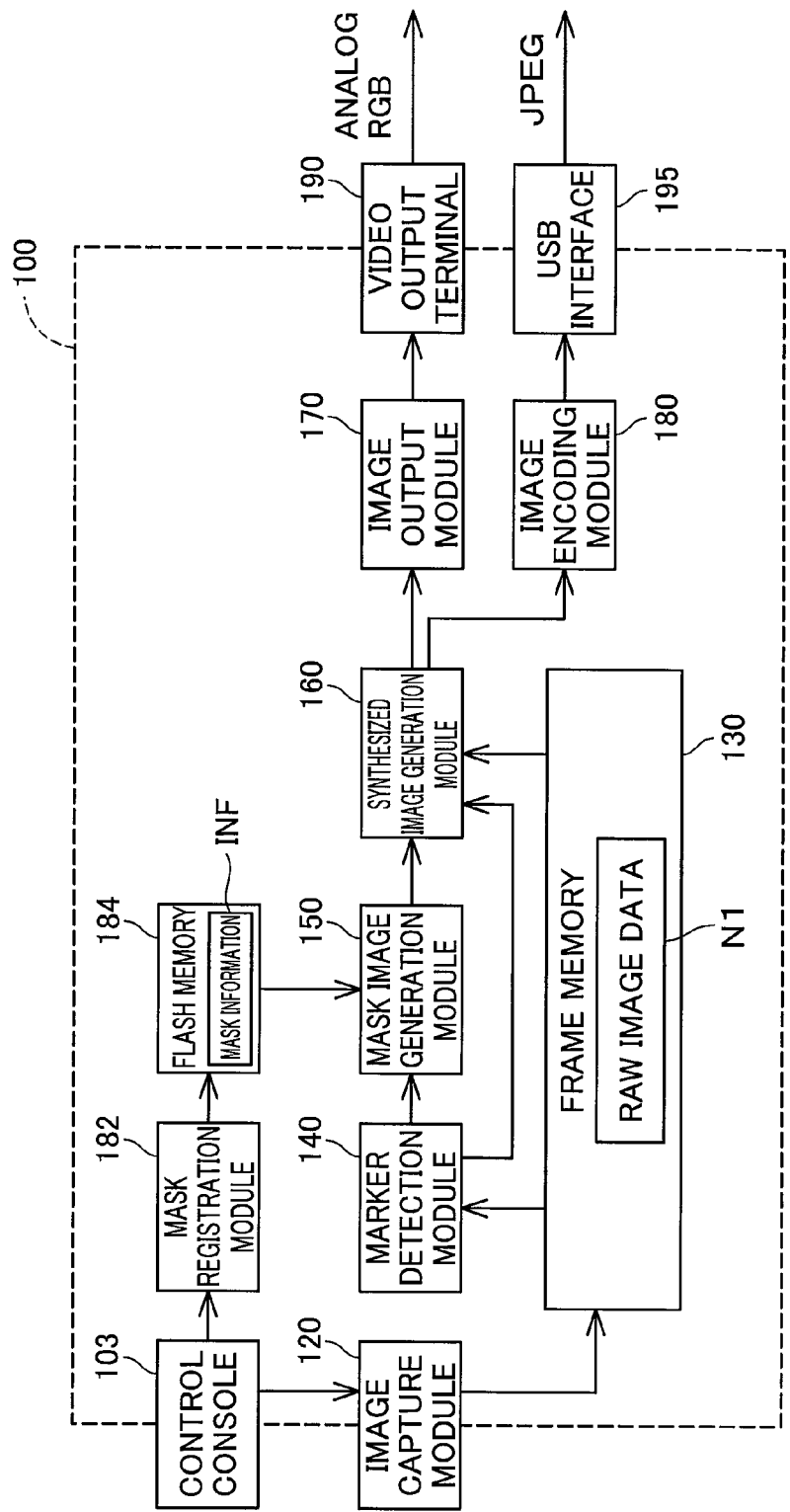
FIG. 2 is a block diagram depicting internal configuration of the presentation device.

FIG. 2 is a block diagram depicting internal configuration of the presentation device. The presentation device 100 includes an image capture module 120, a frame memory 130, a marker detection module 140, a mask image generation module 150, a synthesized image generation module 160, an image output module 170, an image encoding module 180, a mask registration module 182, and a flash memory 184. Of these, the marker detection module 140, the mask image generation module 150, the synthesized image generation module 160, the image output module 170, the image encoding module 180, and the mask registration module 182 are implemented through hardware, using ASICs (Application Specific Integrated Circuits).

The image capture module 120 includes a CCD camera housed inside the camera head 106, and an analog front end circuit adapted to convert the analog signal output by the CCD camera to a digital signal. The image capture module 120 has an optical zoom function, and the magnification factor can be adjusted through operation of the control console 103. The image capture module 120 takes a 15-frame image every second, and sequentially records the images as raw image data N1 in the flash memory 130.

The marker detection module 140 analyzes the raw image data N1 recorded in the frame memory 130, and ascertains whether an image representing a masking process marker MK is present therein. If a masking process marker MK is present, it then further identifies that class of the masking process marker MK. Classes of masking process markers MK are recorded in masking information INF that is recorded in the flash memory 184.

FIG. 3 is an illustration depicting an example of masking information INF. In the present embodiment, several different types (three types in the present embodiment) of Create Mask markers MKa, MKb, MKc (first markers) and one type of Erase Mask marker (second marker) are included as classes of masking process markers MK. The masking information INF associates with each of the Create Mask markers MKa, MKb, MKc masking range data that indicates a range for masking to be performed when each Create Mask marker MKa, MKb, or MKc is placed on the document ST. This masking range data represents, in terms of relative coordinates from the current position of the Create Mask marker MKa, MKb, or MKc, a range over which masking is to be carried out. FIG. 3 depicts an example in which the data representing rectangular areas is recorded as masking range data, but masking ranges could be other polygonal shapes besides rectangular, such as circular, triangular, or pentagonal. Also, several sets of masking range data may be associated with a single Create Mask marker.

If through analysis of the raw image data N1, the marker detection module 140 depicted in FIG. 2 decides that the raw image data N1 contains a Create Mask marker MKa, MKb, or MKc, it then identifies the class of the Create Mask marker (MKa-MKc), and detects the current position, inclination, and size of the Create Mask marker in the raw image data N1. Also, if through analysis of the raw image data N1, the marker detection module 140 decides that the raw image data N1 contains the Erase Mask marker MKe, it outputs a signal to erase the mask image MI (hereinafter termed "erase signal") to the synthesized image generation module 160, discussed later.

In response to the class of Create Mask marker detected by the marker detection module 140, the mask image generation module 150 reads the corresponding mask range data from the mask information INF. On the basis of the read mask range data, it then generates a mask image MI for hiding a portion of the raw image data N1.

The synthesized image generation module 160 then synthesizes the mask image MI that was generated by the mask image generation module 150 with the raw image data N1 that was recorded to the frame memory 130, to generate synthesized image data. The synthesized image data is then sent on to the image output module 170 and the image encoding module 180. If an erase signal was received from the marker detection module 140, the synthesized image generation module 160 does not carry out synthesis of the mask image with the raw image data N1, but instead sends the unmodified raw image data N1 to the image output module 170 and the image encoding module 180.

The image output module 170 performs D/A conversion and frame rate conversion of the synthesized image data or raw image data N1 that was forwarded to it by the synthesized image generation module 160, and outputs the data as an analog RGB signal from the video output terminal 190.

The image encoding module 180 encodes to data of JPEG format the synthesized image data or raw image data N1 that was sent to it by the synthesized image generation module 160, and outputs the data from the USB interface 195. The image encoding module 180 may be set up to perform encoding to JPEG data and output of JPEG data only when a computer is connected to the USB interface 195.

Prior to execution of the masking process, described later, the mask registration module 182 receives mask range data entered by user through the control console 103, and records the data in the masking information INF in the flash memory 184. Specifically, using the control console 103 the user may for example specify a mask image MI range corresponding to a Create Mask marker, while verifying the position of the marker on the document ST which is displayed on the liquid crystal display 200. The mask image MI range (mask range data) so specified is then associated with a class of Create Mask marker displayed on the liquid crystal display 200, and is recorded to the masking information INF in the flash memory.

B. Masking Process

Figure 4:
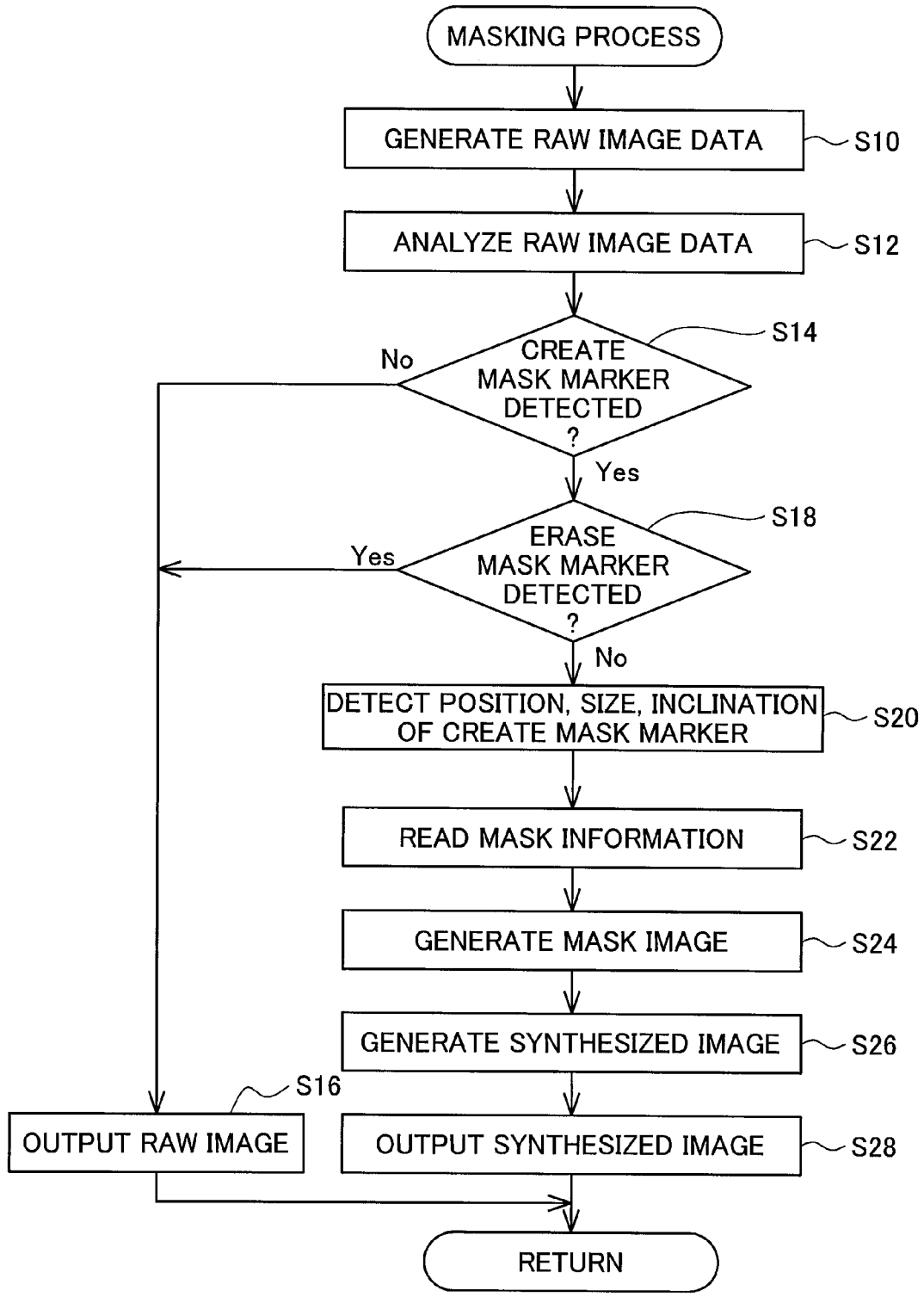
FIG. 4 is a flowchart of a masking process.

FIG. 4 is a flowchart of a masking process that is executed cooperatively by the blocks shown in FIG. 2. This masking process is executed repeatedly during the time that the presentation device 100 is powered on. When the masking process is executed, the image capture module 120 captures an image of the document ST and generates raw image data N1 which is then recorded to the frame memory 130 (Step S10).

Once the raw image data N1 is recorded to the frame memory 130, the marker detection module 140, using a known pattern matching process, analyzes whether a masking process marker MK is present in the raw image data N1 (Step S12). On the basis of the analysis, it is then determined whether a Create Mask marker MKa-MKc was detected as a masking process marker MK (Step S14), and if a Create Mask marker MKa-MKc was not detected, the unmodified raw image data N1 captured by the image capture module 120 continues to be output by the image output module 170 and the image encoding module 180 (Step S16).

If in Step S14 it is decided that a Create Mask marker MKa-MKc was detected, the marker detection module 140 now determines if an Erase Mask marker MKe was detected in the raw image data N1 (Step S18). If an Erase Mask marker MKe was not detected, the marker detection module 140 now detects the class of the Create Mask marker that was detected in Step S14, as well as the position of the Create Mask marker within the raw image, its size, and inclination (Step S20). If multiple classes of Create Mask markers are detected at this time, position, size, and inclination of each Create Mask marker is detected.

Once the class, position, size, and inclination of Create Mask marker is detected in Step S20, the mask image generation module 150 then reads the mask range data that corresponds to the class of the detected Create Mask marker, from the mask information INF that was saved to the flash memory 184 (Step S22), and generates a mask image MI (Step S24). At this time, using a known coordinate transformation process (e.g. affine transformation) the mask image generation module 150 adjusts the position, inclination, and size of the mask image MI according to the position, inclination, and size of the Create Mask marker detected in Step S20.

Once the mask image MI is generated by the mask image generation module 150, the synthesized image generation module 160 reads the raw image data N1 from the frame memory 130. The mask image MI that was generated by the mask image generation module 150 is then synthesized with the raw image data N1 to generate a synthesized image (Step S26). Once a synthesized image is generated in this way, the synthesized image is then output by the image output module 170 and the image encoding module 180 (Step S28).

Figure 5:
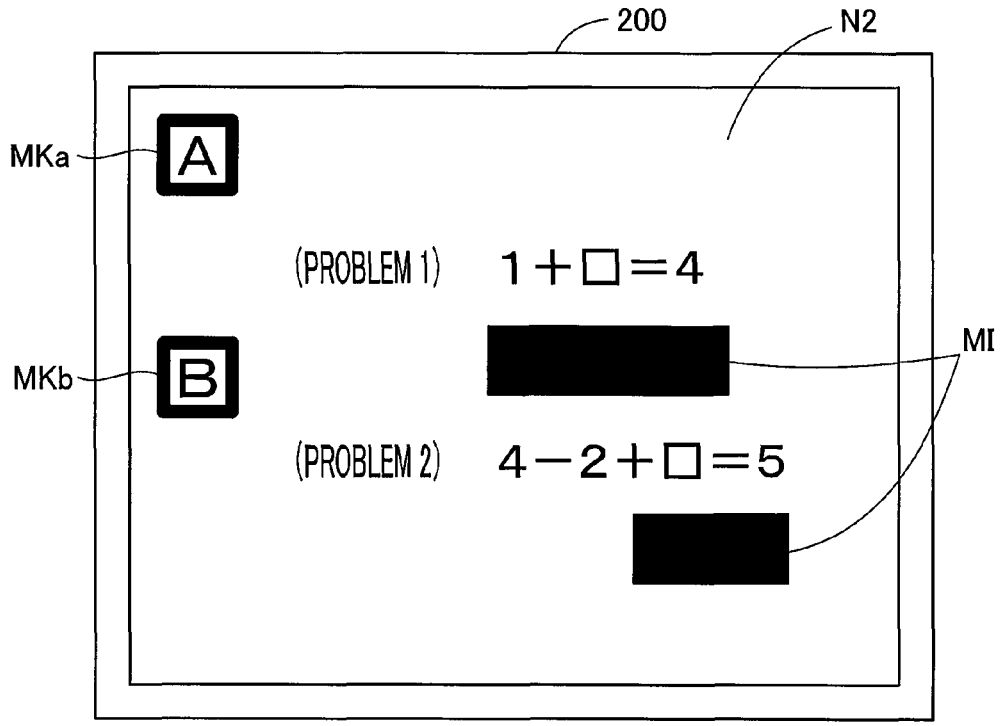
FIG. 5 is an illustration depicting an example of a synthesized image displayed on a liquid crystal display.

FIG. 5 is an illustration depicting an example of a synthesized image N2 displayed on the liquid crystal display 200. FIG. 5 shows a display example of the synthesized image N2 in an instance in which the raw image data N1 contains two Create Mask markers MKa, MKb. Where two Create Mask markers MKa, MKb are positioned in the raw image data N1 in this way, respective mask range data sets for the two Create Mask markers MKa, MKb are read from the mask information INF, and a mask image MI is displayed at each single position of the Create Mask markers MKa, MKb.

Figure 6:
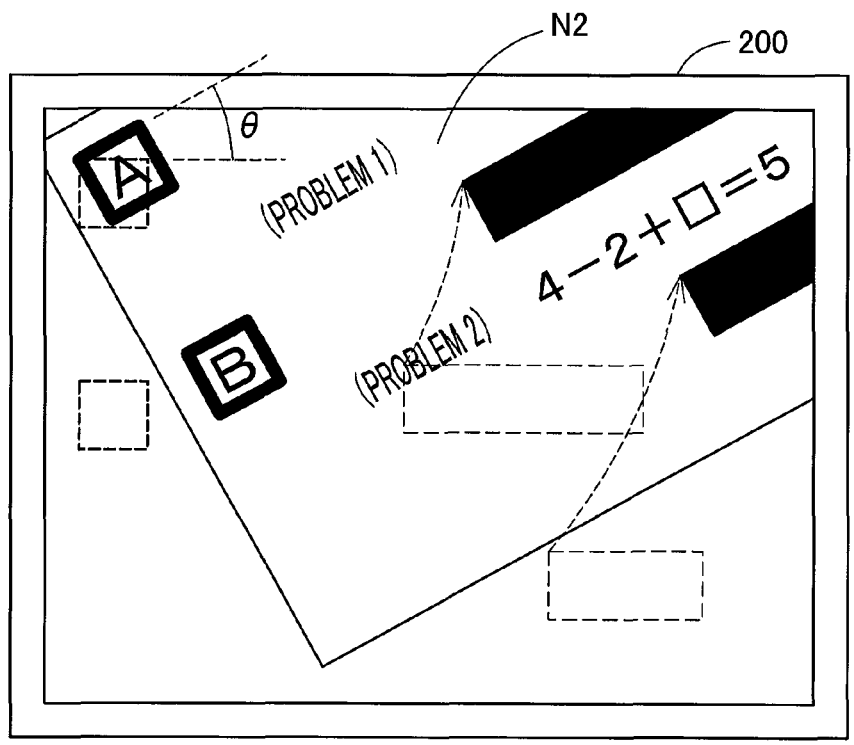
FIG. 6 is an illustration depicting a display example in an instance in which a Create Mask marker is inclined at an angle.

FIG. 6 is an illustration depicting a display example in an instance in which the Create Mask marker is inclined at an angle. Where the Create Mask marker is inclined at an angle θ within the raw image data N1, the coordinates of the mask range data are adjusted according to this angle θ. As a result, the position and inclination of the mask image MI within the raw image data N1 are adjusted as shown in FIG. 6.

Figure 7A:
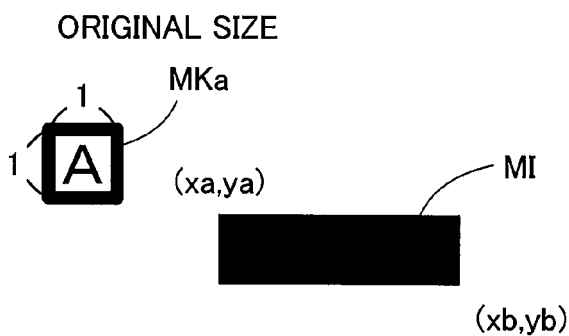
FIGS. 7(a) and 7(b) are drawings depicting a display method in an instance in which Create Mask marker size differs from the original size.
Figure 7B:
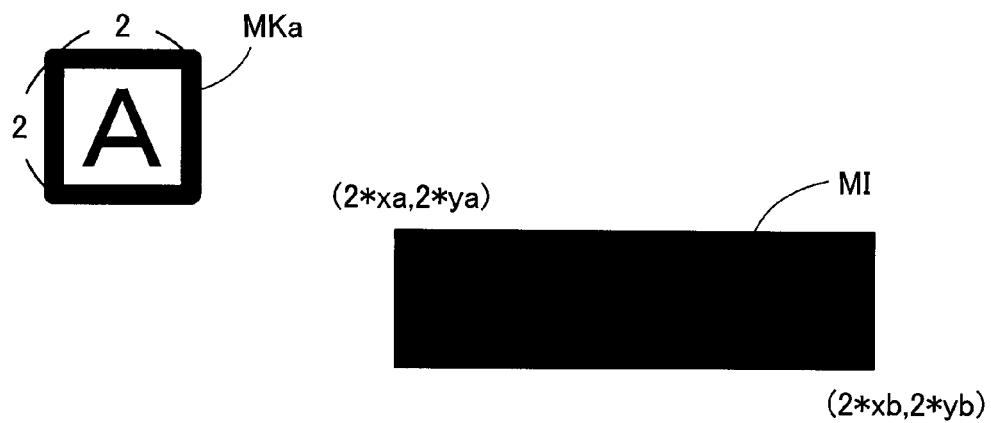

FIG. 7 is a drawing depicting a display method in an instance in which the size of a Create Mask marker detected in raw image data differs from the original size. FIG. 7 (a) depicts the original size of the Create Mask marker, and FIG. 7 (b) depicts an example in which a Create Mask marker enlarged 2× through optical zoom is detected in the raw image data. In instances such as this in which Create Mask marker size different from the original size is detected, the display position and size of the mask image MI are adjusted according to the magnification factor (2× in the case of FIG. 7).

If the Create Mask marker is inclined within the raw image data, and if moreover the Create Mask marker is different from its original size, the processes illustrated in FIG. 6 and FIG. 7 are performed simultaneously on the mask image MI.

Figure 8:
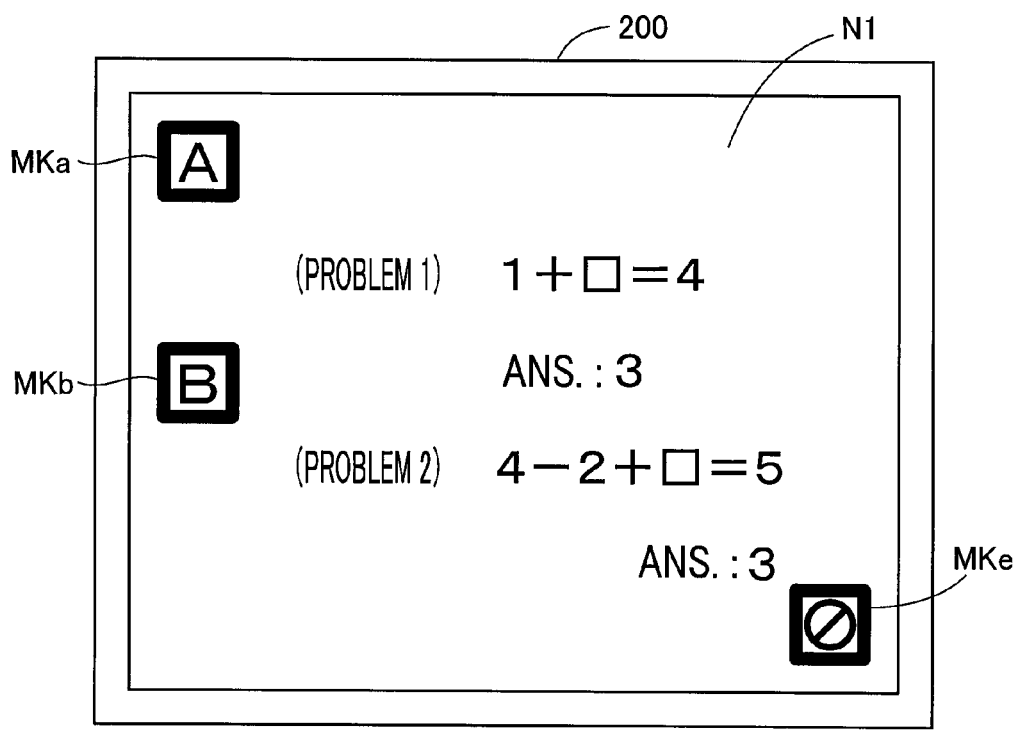
FIG. 8 is a drawing depicting a display example in an instance in which an Erase Mask marker is detected in raw image data.

FIG. 8 is a drawing depicting a display example in an instance in which an Erase Mask marker MKe is detected in raw image data. In Step S18 above, if an Erase Mask marker MKe is detected in the raw image data N1, an erase signal is output from the marker detection module 140 to the synthesized image generation module 160. As a result, even if the Create Mask markers MKa, MKb are present in the raw image data N1 as shown in FIG. 8, mask images MI are not synthesized with the raw image data N1, m and the unmodified raw image data N1 is output from the image output module 170 or the image encoding module 180 (Step S16). Thus, if for example the Erase Mask marker MKe is positioned on the document ST subsequent to display of mask images MI thereon, the previously displayed mask images MI are erased, and the content of the document ST is displayed on the liquid crystal display 200.

According to the presentation device 100 of the present embodiment described above, mask images registered beforehand in mask information INF may be synthesized with the raw image data for display, simply by positioning Create Mask markers on the document ST. Thus, the user can easily mask a desired range on the document. Masking ranges are registered in mask information INF that is looked up during generation of mask images MI, in the form of relative coordinates from the position of the Create Mask marker. Thus, even if the document ST shifts, the mask image MI also shifts on the display screen in response to shifting of the document ST. As a result, it is possible for the user to accurately mask the desired section. Additionally, according to the present embodiment, the inclination and size of mask images MI are adjusted according to the inclination and size of the Create Mask markers, so the user is able to accurately mask the desired section regardless of the orientation in which the document ST is captured.

In the present embodiment, when an Erase Mask marker is positioned on the document ST, even if a Create Mask marker was previously positioned on the document ST, the mask image MI is erased. Thus, even if for example the document ST has a Create Mask marker printed thereon, it is possible to easily erase the mask image MI. Also, according to the present embodiment, if an Erase Mask marker MKe is detected in the raw image data, the mask image MI is erased regardless of the position, inclination, and size of the Create Mask marker, so it is possible for mask images to be deleted more easily.

C. Modifications

It is to be understood that while the invention has been shown herein through certain preferred embodiments, there is no intention to limit the invention thereto, and various alternative aspects are possible within the spirit and scope of the invention. Possible modifications include the following, for example.

Modification 1

In the preceding embodiment, registration of mask range data is carried out using the control console 103 provided to the presentation device 100. However, registration of mask range data may be carried out by some other method. For example, if the flash memory 184 shown in FIG. 2 is provided as a detachable memory card, it is possible for mask range data to be edited beforehand by a computer or the like. Alternatively, it is possible for mask range data to be edited directly from a computer connected via the USB interface 195.

Modification 2

Registration of mask range data may be accomplished by other methods as well. For example, the user pre-positions a Create Mask marker on the document ST, and then places over the section to be masked paper of prescribed color equal in dimensions to the section to be masked. In this condition, the document ST is captured by the image module 120 of the presentation device, whereupon the marker detection module 140 detects the Create Mask marker and the range of prescribed color mentioned above. Once the Create Mask marker and the range of prescribed color are detected in this way, the mask registration module 182 associates the detected range of prescribed color with the Create Mask marker that was detected at the same time, and records the association in the mask information INF. By registering mask range data by this method, it is possible for the user to easily register mask range data.

Modification 3

The preceding embodiment showed an example in which a prescribed gap is provided between the Create Mask marker and the mask image MI. However, the mask image MI may instead be displayed adjacently to the Create Mask marker. This makes it easy for the user to specify a position for placement of the mask image MI. In this case, the range that is masked may be established in advance according to the design of the Create Mask marker. Through selective use of the Create Mask markers the user can thus easily specify a range for masking.

Modification 4

In the preceding embodiment, the Create Mask markers have a design with a letter of the alphabet positioned within a rectangular frame, but Create Mask markers could instead be composed of a barcode or the like. Mask range data would then be recorded in the barcode. With this arrangement, the range for masking can be determined through analysis of the barcode, without having to register mask range data in the flash memory 184.

Modification 5

In the preceding embodiment, Create Mask markers and an Erase Mask marker are provided as the masking process markers, but the masking process markers are not limited to these, and markers that enable execution of various other processes relating to mask synthesis may be provided as well. For example, markers that enable display of predetermined still images or video within mask images MI may be provided. Markers for carrying out animation that renders mask images MI progressively lighter in color, or animation that shifts mask images MI to another position or off-screen may be provided as masking process markers.

Modification 6

In the preceding embodiment, all mask images MI are erased when an Erase Mask marker is detected in the raw image data N1. However, alternative arrangements in which, for example, only the mask image MI that is closest to the Erase Mask marker is erased are also possible. Also, where multiple classes of Create Mask markers are provided, corresponding Erase Mask markers may be respectively provided for the Create Mask markers. This makes it possible to easily specify a mask image MI for erasure.

Modification 7

In the preceding embodiment, the masking process depicted in FIG. 4 is carried out by ASICs constituting the marker detection module 140, the mask image generation module 150, the synthesized image generation module 160, the image output module 170, and the image encoding module 180. However, the masking process may be carried out through software by a microcomputer furnished with a CPU, RAM and ROM.

Modification 8

In the preceding embodiment, the Create Mask markers have a design with a letter of the alphabet positioned within a rectangular frame. However, this design is arbitrary, and any design enabling detection of position, direction, and size is acceptable. Likewise, any design may be selected appropriately as the design for the Erase Mask marker.

What is claimed is:

1. A presentation device comprising:
an image capture portion for capturing an image of a subject and generating a raw image thereof;
a detection portion to analyze whether a first marker is present in the raw image, and if the first marker is present in the raw image, to detect an existing position of the first marker within the raw image;
a storage portion for storing a positional relationship of a synthesis position at which a mask image for masking at least a portion of the raw image is to be synthesized with the raw image relative to the existing position of the first marker;
a synthesized image generation portion to determine the synthesis position according to the positional relationship with the detected existing position, and to synthesize the mask image at the determined synthesis position within the raw image to generate a synthesized image; and
an output portion for outputting the synthesized image, wherein
the detection portion further analyzes whether a second marker different from the first marker is present in the raw image; and
if the second marker is present in the raw image, the synthesized image generation portion executes a process to erase the mask image from the synthesized image.

2. The presentation device according to claim 1, wherein if the first marker is present in the raw image, the detection portion further detects the inclination of the first marker; and
the synthesized image generation portion adjusts the synthesis position and the inclination of the mask image according to the detected inclination.

3. The presentation device according to claim 1, wherein if the first marker is present in the raw image, the detection portion further detects a size of the first marker; and the synthesized image generation portion adjusts the synthesis position and a size of the mask image according to the detected size.

\* \* \* \* \*